(12) United States Patent
Kim et al.

(10) Patent No.: US 9,191,806 B2
(45) Date of Patent: *Nov. 17, 2015

(54) METHOD AND APPARATUS FOR RETRANSMITTING MTC GROUP MESSAGE IN WIRELESS COMMUNICATION SYSTEM

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

This patent is subject to a terminal disclaimer.

(21) Appl. No.: 14/060,333

(22) Filed: Oct. 22, 2013

(65) Prior Publication Data

US 2014/0112251 A1    Apr. 24, 2014

Related U.S. Application Data

(60) Provisional application No. 61/717,625, filed on Oct. 23, 2012.

(51) Int. Cl.
| | |
|---|---|
| *H04W 4/00* | (2009.01) |
| *H04W 8/22* | (2009.01) |
| *H04L 1/00* | (2006.01) |
| *H04L 12/18* | (2006.01) |
| *H04W 4/12* | (2009.01) |
| *H04L 29/14* | (2006.01) |

(52) U.S. Cl.
CPC . *H04W 8/22* (2013.01); *H04L 1/00* (2013.01); *H04L 12/18* (2013.01); *H04L 12/189* (2013.01); *H04W 4/005* (2013.01); *H04W 4/12* (2013.01); *H04L 69/40* (2013.01)

(58) Field of Classification Search
CPC ........................................................ H04W 8/22
USPC .................................................. 370/328–339
See application file for complete search history.

(56) References Cited

U.S. PATENT DOCUMENTS

| | | | |
|---|---|---|---|
| 2013/0136072 A1* | 5/2013 | Bachmann et al. ........... | 370/329 |
| 2013/0155954 A1* | 6/2013 | Wang et al. ................... | 370/328 |

* cited by examiner

*Primary Examiner* — Iqbal Zaidi
(74) *Attorney, Agent, or Firm* — Birch, Stewart, Kolasch & Birch, LLP

(57) ABSTRACT

A method and apparatus for retransmitting an MTC group message in a wireless communication system are disclosed. A method for performing retransmission of a Machine Type Communication (MTC) group message by an MTC-Inter-Working Function (MTC-IWF) in a mobile communication system includes: receiving an MTC group message response from a network node; and determining whether to perform retransmission of the MTC group message on the basis of information contained in the MTC group message response, wherein the MTC group message response includes zero or more region information of a predetermined unit, related to completion of the MTC group message transmission.

11 Claims, 10 Drawing Sheets

METHOD AND APPARATUS FOR RETRANSMITTING MTC GROUP MESSAGE IN WIRELESS COMMUNICATION SYSTEM

This application claims the benefit of U.S. Provisional Application No. 61/717,625, filed on Oct. 23, 2012, which is hereby incorporated by reference as if fully set forth herein.

BACKGROUND OF THE INVENTION

1. Field of the Invention

The present invention relates to a wireless communication system, and more particularly to a method and apparatus for channel access in a wireless LAN (WLAN) system.

2. Discussion of the Related Art

Machine Type Communication (MTC) refers to a communication scheme including one or more machines, and may also be referred to as Machine Type Communication (MTC) or Machine To Machine (M2M) communication. In this case, the machine may be an entity that does not require direct handling and intervention of a user. For example, not only a meter or vending machine including a mobile communication module, but also a user equipment (UE) (such as a smartphone) capable of performing communication by automatically accessing the network without user intervention/handling may be an example of such machines. Various examples of such machines may be referred to as MTC devices or MTC UEs. In other words, MTC communication refers to a communication scheme including one or more machines (i.e., one or more MTC devices) without user intervention/handling.

MTC may include Device-to-Device (D2D) communication and communication between an MTC device and an MTC application server, etc. Exemplary communication between the MTC device and the MTC application server includes communication between a vending machine and an application server, communication between a Point of Sale (POS) device and an application server, and communication between an electric meter, a gas meter or a water meter and a server. MTC-based communication applications may include security, transportation, healthcare, etc.

SUMMARY OF THE INVENTION

Accordingly, the present invention is directed to a method and apparatus for retransmitting an MTC group message in a wireless communication system that substantially obviate one or more problems due to limitations and disadvantages of the related art.

An object of the present invention is to provide a method for correctly and efficiently retransmitting a group message to an MTC device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing retransmission of a Machine Type Communication (MTC) group message by a MTC-InterWorking Function (MTC-IWF) in a mobile communication system includes: receiving an MTC group message response from a network node; and determining whether to perform retransmission of the MTC group message on the basis of information contained in the MTC group message response, wherein the MTC group message response includes zero or more region information of a predetermined unit, related to completion of the MTC group message transmission.

In accordance with another aspect of the present invention, a Machine Type Communication-InterWorking Function (MTC-IWF) device/node for use in a wireless communication system includes: a transceiver module; and a processor, wherein the processor receives an MTC group message response from a network node, and determines whether to perform retransmission of the MTC group message on the basis of information contained in the MTC group message response, wherein the MTC group message response includes zero or more region information of a predetermined unit, related to completion of the MTC group message transmission.

The region information may indicate information regarding a region where transmission of the MTC group message has been completed.

The determining whether to perform the retransmission may further include: comparing information regarding a region where transmission is performed with information regarding another region where the transmission has been completed.

If the MTC group message response includes zero region information of the predetermined unit, the MTC-IWF may determine that transmission to all regions has failed.

The region information may indicate information regarding a region where transmission of the MTC group message was not completed.

If a response to the MTC group message may include zero region information of the predetermined unit, the MTC-IWF decides not to perform the retransmission.

The determining whether to perform the retransmission may include at least one of priority information, information requesting the retransmission, and validity period information of the MTC group message.

The MTC-IWF may decide to retransmit only a high-priority group message.

The information requesting retransmission may include information indicating whether retransmission to some regions is allowed, and if the information requesting retransmission indicates that the retransmission to the some regions is not allowed, the MTC-IWF may always decide not to perform the retransmission.

The information requesting retransmission may include information indicating whether retransmission per user equipment (UE) is allowed.

The predetermined unit may be any one of a tracking area unit, a tracking area list unit, an emergency area unit, an eNB unit, and a mobility management entity (MME).

The network node may be a Cell Broadcast Centre (CBC).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

DESCRIPTION OF SPECIFIC EMBODIMENTS

Figure 1:
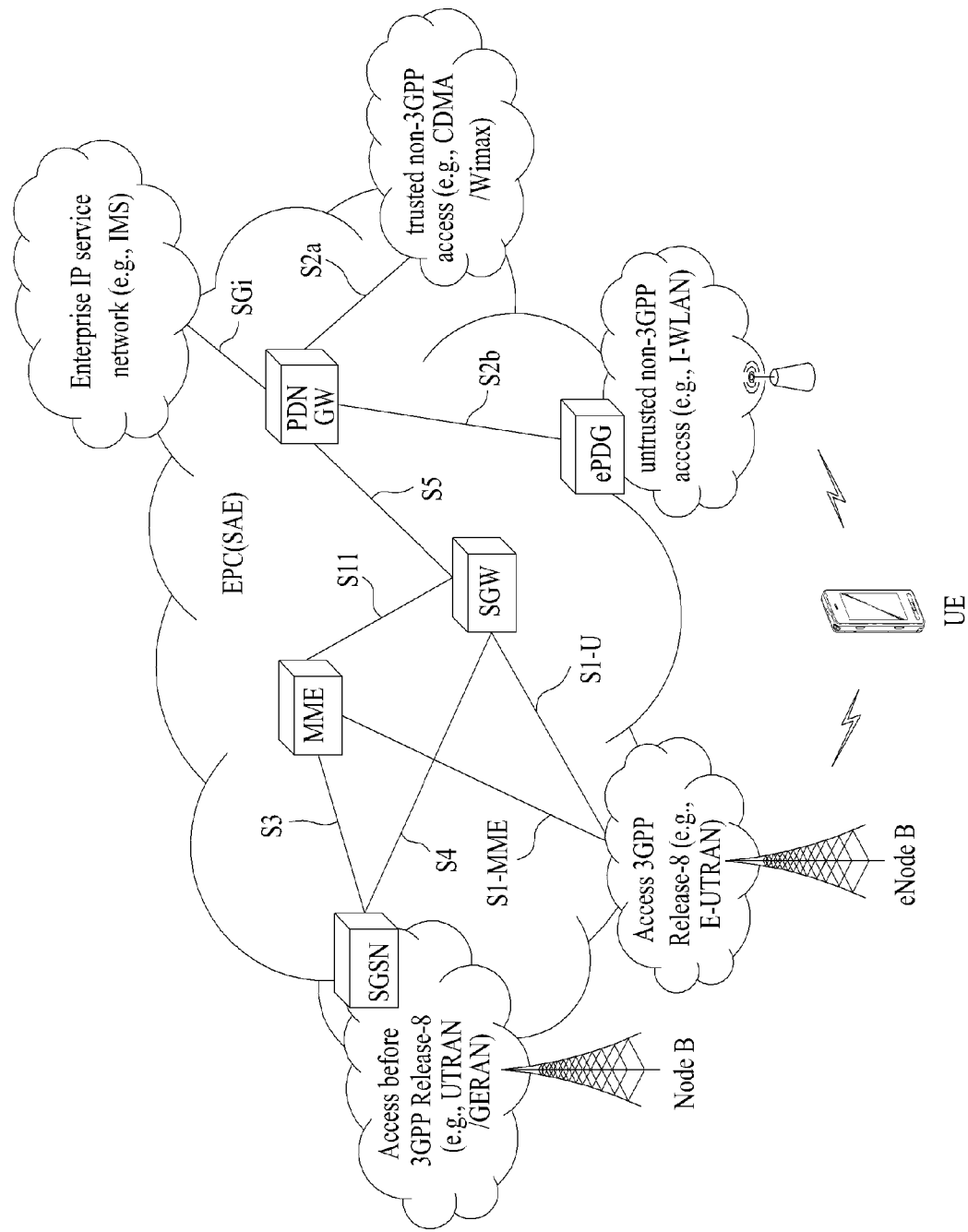
FIG. 1 is a diagram showing the schematic architecture of an evolved packet system (EPS).

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics. Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless communication systems. For clarity, the following description focuses on 3GPP LTE and 3GPP LTE-A systems. However, technical features of the present invention are not limited thereto.

The terms to be described in the following description are defined as follows.

Universal Mobile Telecommunications System (UMTS): UMTS refers to a GSM (Global System for Mobile Communication)-based third generation mobile communication technology developed by the 3GPP.

Evolved Packet System (EPS): EPS refers to a network system including not only an Evolved Packet Core (EPC) serving as an IP-based packet switched core network (CN), but also an access network such as LTE, UTRAN, etc. EPC refers to a network evolved from UMTS.

NodeB: NodeB refers to a base station (BS) of a UMTS network, which is installed outdoors and has a coverage corresponding to a macro cell.

eNodeB: eNodeB refers to a base station of an EPS network, which is installed outdoors and has a coverage corresponding to a macro cell.

User Equipment (UE): UE may be referred to as a terminal, a Mobile Equipment (ME), or a Mobile Station (MS), etc. The UE may be a type of portable equipment having a communication function, such as a laptop, a cellular phone, a Personal Digital Assistant (PDA), a smart phone, and a multimedia device, or may be a type of fixed equipment, such as a Personal Computer (PC) or a vehicle-mounted device. The term "UE", as used with respect to MTC-related, may refer to an MTC device.

IP Multimedia Subsystem (IMS): IMS refers to a subsystem for providing IP-based multimedia services.

International Mobile Subscriber Identity (IMSI): IMSI refers to a user ID that is globally and uniquely allocated in a mobile communication network.

Machine Type Communications (MTC): MTC is carried out by a machine without user intervention. MTC may also be referred to as Machine To Machine (M2M) communication.

MTC terminal (MTC UE or MTC device): MTC terminal (e.g., a vending machine, a meter, etc.) refers to a UE that has a communication function through a mobile communication network and serves a specific purpose.

MTC server: MTC server is located on a network to manage an MTC UE. The MTC server may be located inside or outside a mobile communication network. The MTC server may have an interface accessible by an MTC user. In addition, the MTC server may provide an MTC-associated service to other servers (such as a Service Capability Server (SCS)), and may also be used as an MTC application server.

MTC application: MTC application may refer to a service to which MTC is applied (e.g., remote metering, product movement tracking, a meteorological sensor, etc.).

MTC application server: MTC application server refers to a server on a network in which an MTC application is executed.

MTC feature: MTC feature is a function of a network supporting an MTC application. For example, MTC monitoring is a feature for preparing for equipment loss in an MTC application such as remote metering, and low mobility is a feature for an MTC application for an MTC device such as a vending machine.

MTC subscriber: Entity which is connected to a network operator and provides a service to one or more MTC terminals.

MTC group: MTC group is a group of MTC devices which share at least one MTC feature and belong to an MTC subscriber.

Services Capability Server (SCS): SCS is an entity connected to a 3GPP network for communication with an MTC device using an MTC-IWF (MTC InterWorking Function) located in a home public land mobile network (HPLMN).

External Identifier: External identifier is a globally unique identifier (ID) for indicating (or identifying) an MTC device (or a subscriber to which the MTC device belongs) by an external entity (e.g., SCS or Application Server) of the 3GPP network. The external identifier is comprised of a domain identifier and a local identifier.

Domain Identifier: Domain identifier is an identifier (ID) for identifying a domain controlled by a mobile network operator. The Domain Identifier is used to identify where services provided by the operator network can be accessed (e.g. MTC-IWF provided services). One operator may use a domain identifier per service so as to provide access to different services.

Local Identifier: Local identifier is an identifier used for deriving or acquiring an International Mobile Subscriber Identity (IMSI). The local identifier should be unique within the application domain, and is managed by the mobile network operator.

External Group Identifier: External Group Identifier is an identifier for indicating (or identifying) an MTC group by an external entity (e.g., SCS or Application Server) of the 3GPP network, and is globally unique. The external group identifier is comprised of a Domain Group Identifier and a Local Group Identifier.

Domain Group Identifier: Domain Group Identifier is an identifier (ID) for identifying a domain controlled by a mobile network operator controlling/managing the corresponding group. One operator may use a domain group identifier per service so as to provide access to different services.

Local Group Identifier: Local group identifier is an identifier (ID) used for deriving or acquiring an internal group identifier as necessary. The local group identifier should be unique within an application domain, and is managed by a mobile network operator.

Internal group identifier: Identifier group identifier is used in a mobile communication network so as to transmit a group message. Another internal group identifier may be derived from the same local group identifier according to a use purpose or a transmission method of the group message. For example, when transmitting a group message using a Cell Broadcast Service (CBS) scheme, the internal group identifier may be a specific message ID. When transmitting a group message using a Multimedia Broadcast and Multicast Service (MBMS) scheme, the internal group identifier may be a specific Temporary Mobile Group Identity (TMGI) value.

Radio Access Network (RAN): Radio access network (RAN) is a unit including a Base Transceiver Station (BTS), a NodeB, an eNodeB, Base Station Controller (BSC) configured to control the BTS and NodeB, and a Radio Network Controller (RNC) configured to control the NodeB. RAN is present between UEs and provides connection to a core network (CN).

Home Location Register (HLR)/Home Subscriber Server (HSS): HLR/HSS is a database including subscriber information of the 3GPP network. HSS may perform various functions, for example, configuration storage, identity management, user state storage, etc.

RAN Application Part (RANAP): RANAP is an interface between nodes (i.e., MME (Mobility Management Entity)/SGSN (Serving GPRS (General Packet Radio Service) Support Node)/MSC (Mobile Switching Center)) configured to control a radio access network (RAN) and a core network (CN).

Public Land Mobile Network (PLMN): PLMN is a network configured to provide a mobile communication service to users. PLMN may be classified according to individual operators.

Non-Access Stratum (NAS): NAS is a functional layer for signaling between a UE and a core network and exchanging a traffic message in a UMTS protocol stack, supports UE mobility, and supports a session management procedure for establishing and maintaining an IP connection between a UE and a PDN GW.

Hereinafter, a description will be given based on the above-described terms.

FIG. 1 is a diagram showing the schematic architecture of an evolved packet system (EPS).

The EPC is a fundamental element of system architecture evolution (SAE) for improving 3GPP performance. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, connection between UEs having IP capability may be achieved through an IP based base station (e.g., an eNodeB (evolved NodeB)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) support node and an enhanced packet data gateway (ePDG).

The SGW operates as a boundary point between a radio access network (RAN) and a core network and is an element which performs a function for maintaining a data path between an eNodeB and a PDN GW. In addition, if a UE moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a UE having IP capabilities may access an IP service network (e.g., an IMS) provided by an operator through various elements in the EPC based on 3GPP access or non-3GPP access.

Figure 2:
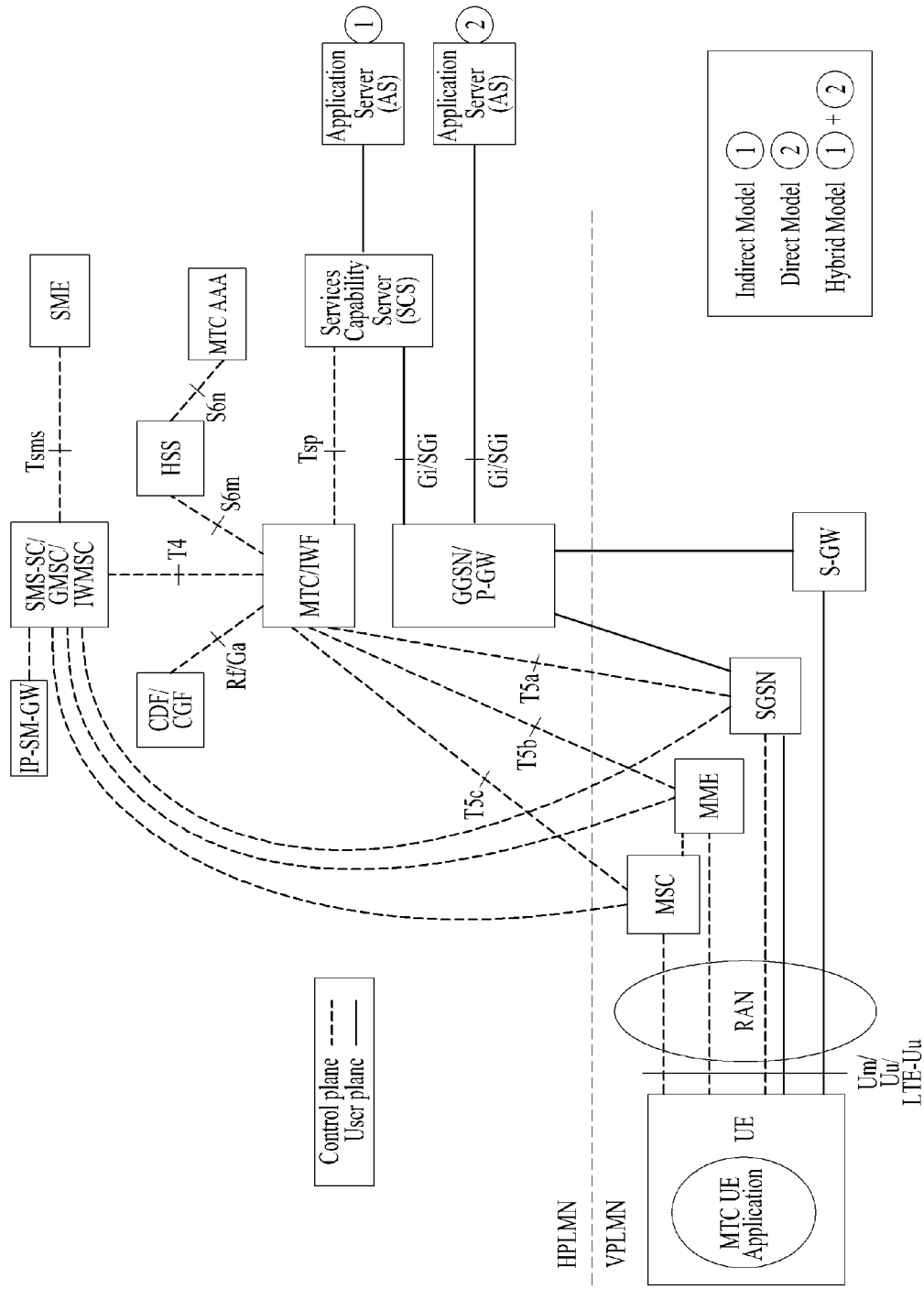
FIG. 2 is a diagram showing an exemplary model of an MTC architecture.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

optimization services facilitating MTC. In FIG. 2, a UE used for MTC is connected to a 3GPP network (UTRAN, E-UTRAN, GERAN, I-WLAN, etc.) through a Um/Uu/LTE-Uu interface. The architecture of FIG. 2 includes various MTC models (Direct model, Indirect model, Hybrid model, etc.) described with reference to FIG. 2.

First, entities shown in FIG. 2 will be described.

In FIG. 2, an application server is a server on a network in which an MTC application is executed and may be referred to as an MTC application server. Technologies for implementing various MTC applications are applicable to an MTC application server and a detailed description thereof will be omitted. In addition, the MTC application server may access an MTC server through a reference point API and a detailed description thereof will be omitted. Alternatively, the MTC application server may be co-located with an MTC server.

An MTC server (e.g., an SCS) is a server on a network for managing an MTC device and may be connected to a 3GPP network to communicate with nodes of a PLMN and a UE used for MTC.

An MTC-interworking function (IWF) may control interworking between an MTC server and an operator core network and serve as a proxy for MTC operation. In order to support an MTC indirect or hybrid model, one or more MTC-IWFs may be present in a home PLMN (HPLMN). The MTC-IWF may relay and interpret a signaling protocol on a reference point (Tsp) to enable a PLMN to perform a specific function. The MTC-IWF may perform a function for authen-

TABLE 1

| Reference point | Description |
| --- | --- |
| S1-MME | Reference point for the control plane protocol between E-UTRAN and MME |
| S1-U | Reference point between E-UTRAN and Serving GW for per bearer user plane tunneling and inter eNodeB path switching during handover |
| S3 | Reference point between MME and SGSN. Enables user and bearer information exchange for inter 3GPP access network mobility in idle and/or active state. This reference point can be used for intra-PLMN or inter-PLMN handover (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP access. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDN GW and mobility support to a user plane.

FIG. 2 is a diagram showing an exemplary model of an MTC architecture.

An end-to-end application between a UE (or an MTC device) used for MTC and an MTC application may use services provided by a 3GPP system and selective services provided by an MTC server. A 3GPP system may provide transport and communication services (including a 3GPP bearer service, an IMS and an SMS) including a variety of ticating an MTC server, a function for authenticating a control plane request from an MTC server, various functions associated with the below-described trigger instructions, etc. before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and storing and forwarding the short message. The IP-SM-GW may serve to perform protocol interworking between an IP based UE and an SMS-SC.

A charging data function (CDF)/charging gateway function (CGF) may perform a charging operation.

HLR/HSS serves to store and provide subscriber information (IMSI, etc.), routing information, configuration information, etc. to the MTC-IWF.

A mobile switching center (MSC)/SGSN/MME may perform a control function such as mobility management, authentication, resource allocation, etc. for network connection of a UE. In association with the below-described triggering, the MSC/SGSN/MME may serve to receive a trigger instruction from the MTC-IWF and process the trigger instruction into the form of a message provided to the MTC device.

A gateway GPRS support node (GGSN)/serving-gateway (S-GW)+packet data network-gateway (P-GW) may serve as a gateway for connecting a core network and an external network.

Table 2 shows main reference points of FIG. 2.

TABLE 2

| Reference point | Description |
| --- | --- |
| Tsms | Reference point used by an entity outside the 3GPP system to communicate with UEs used for MTC via SMS. |
| Tsp | Reference point used by an SCS to communicate with the MTC-IWF related to control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrogate UE identity (HSS/HLR for E.164 mobile station international subscriber directory number (MSISDN) or external identifier mapping to IMSI) and gather UE reachability and configuration information. |

Among T5a, T5b and T5c, one or more reference points may be referred to as T5.

In case of the indirect and hybrid model, user plane communication with an MTC server may be performed and, in case of the direct and hybrid model, communication with an MTC application server may be performed using a conventional protocol through Gi and SGi.

Details associated with description of FIG. 2 may be incorporated by referring to 3GPP TS 23.682.

In the case of MTC, it is expected that many more MTC devices than general UEs are present on the network. Accordingly, a minimum amount of network resources, a minimum number of signaling times, and a minimum amount of power should be consumed for MTC.

In addition, in order to consume a minimum amount of system resources, the MTC device may not establish IP connection to the MTC application server at ordinary times. If the MTC device does not establish IP connection such that the MTC application server fails to transmit data to the MTC device, the MTC device may generate a request or indication for IP connection establishment. This request or indication is referred to as trigger indication. That is, the MTC device triggering is requested under the condition that the IP address of the MTC device is unavailable or unreachable by the MTC application server. (This situation that the IP address of the MTC device is unreachable to a certain entity or an address of the corresponding entity means that a message transmission attempt fails because the corresponding entity is absent from the corresponding address). To accomplish this, the MTC device may receive the trigger indication from the network. Upon receiving the trigger indication, the MTC device needs to perform operations of the MTC application embedded therein, or needs to establish communication with the MTC application server. In this case, when the MTC device receives the trigger indication, any one of the following three cases (a, b, c) may be assumed: wherein the first case (a) indicates that the MTC device is offline (i.e., MTC device is not attached to the network), the second case (b) indicates that the MTC device is online (i.e., MTC device is attached to the network) but data connection to the MTC device is not established, and the third case (c) indicates that the MTC device is online (i.e., MTC device is attached to the network) and data connection to the MTC device is established.

For example, triggering of the MTC device may indicate that, when IP connection (or PDN connection) through which the corresponding MTC device can receive data from the MTC application server (or when the corresponding MTC device cannot receive user data whereas it receives a basic control signal), the corresponding MTC device performs the operations of the MTC application embedded therein using a triggering message, and requests IP connection from the MTC application server. In addition, the triggering message may enable the network to route a necessary message to an appropriate MTC device, and may be a message including specific information (hereinafter referred to as triggering information) that allows the MTC device to route a message to an application of an appropriate MTC device.

Figure 3:
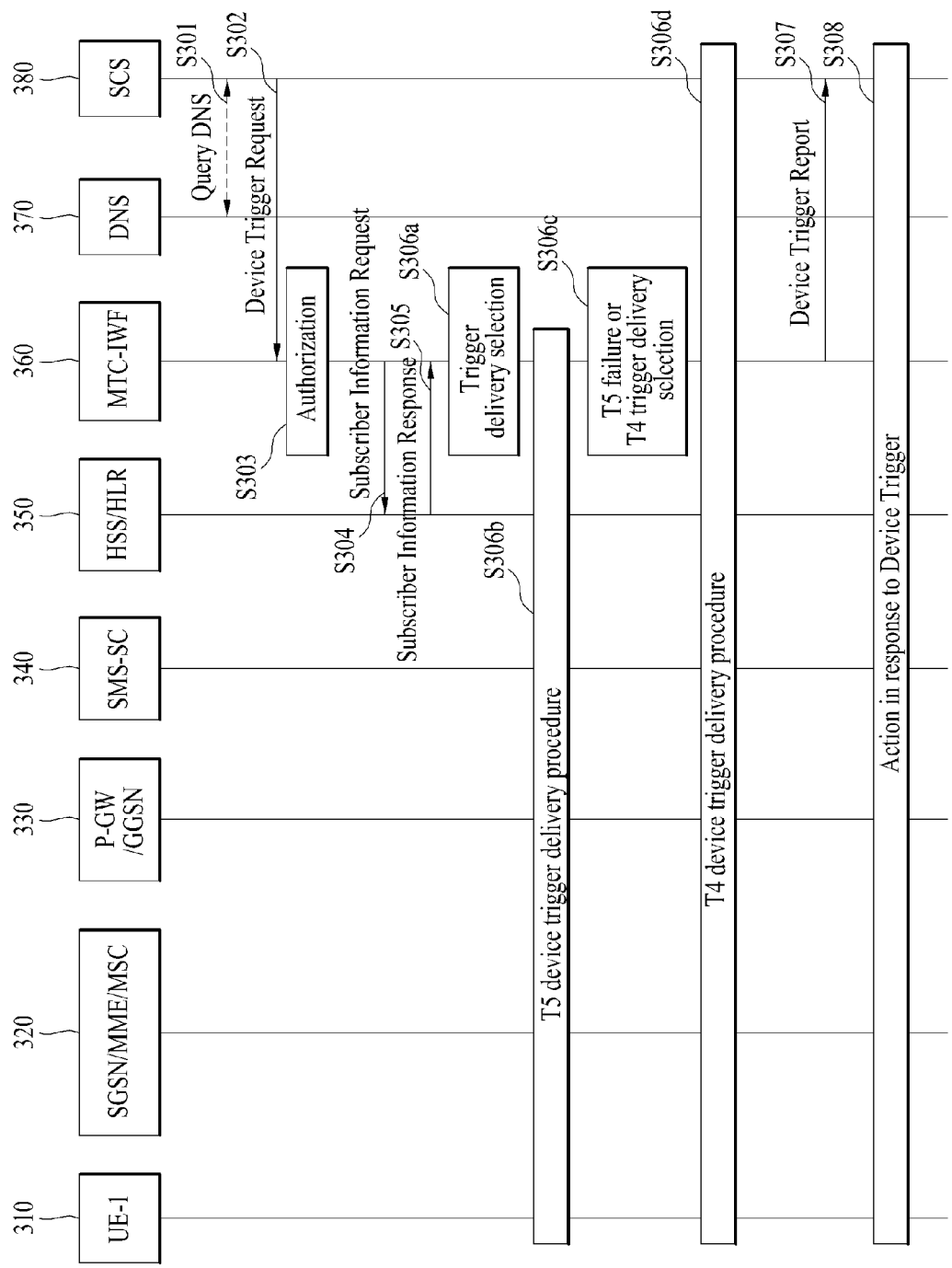
FIG. 3 is a conceptual diagram illustrating an MTC trigger procedure.

A detailed description of the MTC triggering procedure will hereinafter be described with reference to FIG. 3.

SCS 380 may decide to trigger the MTC device in step S301. If there is no information regarding MTC-IWF to which the SCS 380 connects for trigger request, the SCS 380 sends a DNS query message to a DNS 370 using either an external identifier of the MTC device to be triggered or an identifier of MTC-IWF configured in the SCS 380, so as to determine an IP address and a port number of the MTC-IWF. Thereafter, the SCS 380 sends a device trigger request message to the MTC-IWF 360 in step S302. The device trigger request message may include information shown in the following Table 3.

TABLE 3 i) External Identifier or MSISDN: Identification of MTC device to be triggered (or a subscriber to which the MTC device belongs)

TABLE 3-continued ii) SCS identifier: Identifier of SCS configured to send the device trigger request message.
iii) Trigger reference number or Reference number: Reference number of the above transmitted device trigger request message.
iv) Validity Period: Time interval in which device trigger request is valid. If the trigger request is not transmitted to the MTC device, the validity period indicates a predetermined time period in which a network entity (e.g., MTC-IWF) has to store the device trigger request therein.
v) Priority: Delivery Priority of the device trigger request.
vi) Trigger payload: Information transferred to the MTC application of MTC device.

MTC-IWF 360 having received the device trigger request message from the SCS 380 verifies the authority as to whether sending the trigger request from the SCS to the 3GPP network is allowed in step S303. If the MTC-IWF 360 fails authority verification, the MTC-IWF 360 sends the SCS 380 a device trigger confirm message indicating that the device trigger request has failed. In contrast, if the MTC-IWF 360 succeeds in authority verification, the following steps may be carried out.

MTC-IWF 360 sends a subscriber information request message to an HSS/HLR 350 in step S304. As a result, the MTC-IWF 360 can check whether the SCS can trigger the MTC device, acquire an IMSI using the MTC device identifier (external identifier or MSISDN) received at step S302, and acquire routing information including the identifiers of the serving node(s) which serve the MTC device.

HSS/HLR 350 checks whether the SCS having transmitted the device trigger request message is allowed to trigger the MTC device in step S305. Thereafter, HSS/HLR 350 transmits a subscriber information response message to the MTC-IWF 360. The subscriber information response message includes an International Mobile Station Identifier (IMSI) and routing information including the identifiers of the serving node(s) serving the MTC device. If the SCS is not allowed to trigger the MTC device in step S305, or if valid subscription information associated with the MTC device is not present in the HSS/HLR 350, the HSS/HLR 350 sends the MTC-IWF 360 a subscriber information response message indicating the absence of such valid subscription information. In this case, the MTC-IWF 360 sends the SCS 380 the device trigger confirm message indicating a failure of the device trigger request, and does not perform subsequent steps.

The MTC-IWF 360 may select a trigger delivery procedure on the basis of information received from the HSS/HLR 350 and a local policy in step S306a.

If the delivery procedure using T5 is selected, the MTC-IWF 360 performs a T5 trigger delivery procedure in step S306b. A detailed description of the T5 trigger delivery procedure will be disclosed later with reference to FIG. 4. If a delivery procedure using T4 is selected in step S306a, or if T5 delivery fails in step S306b, the MTC-IWF 360 performs a T4 trigger delivery procedure in steps S306c~S306d. A detailed description of the T4 trigger delivery procedure will be disclosed later with reference to FIG. 5.

The MTC-IWF 360 transmits a device trigger report message indicating a response to the device trigger request message of step S302 to the SCS 380 in step S307. The device trigger report message may indicate whether a trigger delivery to the resultant MTC device of the device trigger requested by the SCS was successful or failed.

As a response to the received device trigger, UE-1 310 performs an operation based on trigger payload content in step S308. This operation may typically include initiating communication with SCS or AS (Application Server).

Figure 4:
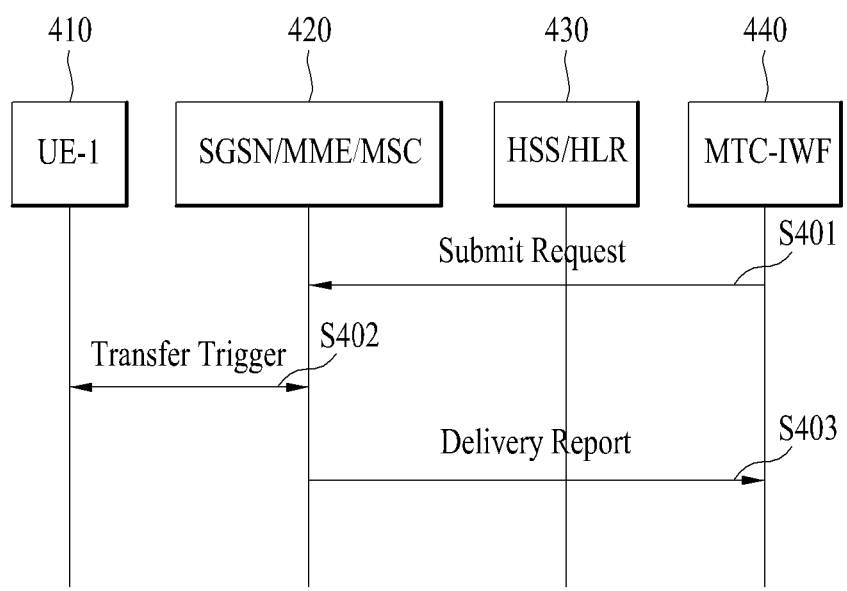
FIG. 4 is a flowchart illustrating the T5 trigger delivery procedure.

FIG. 4 is a flowchart illustrating the T5 trigger delivery procedure. When the MTC-IWF receives the device trigger request from the SCS in step S302 of FIG. 3, the MTC-IWF may select an appropriate trigger delivery procedure on the basis of information received from the HSS/HLR and a local policy in steps S304~S306a of FIG. 3. As a result, the MTC-IWF may transmit the device trigger request to an SGSN through a T5a interface, may transmit the device trigger request to an MME through a T5b interface, and may transmit the device trigger request to an MSC through a T5c interface (the device trigger through the T5a, T5b, or T5c interface may be referred to as T5 device trigger). Alternatively, the MTC-IWF may transmit the device trigger request to an SMC-SC through a T4 interface. For example, as can be seen from FIG. 4, if there are plural available serving nodes based on information acquired from HSS/HLR, the MTC-IWF 440 may select an appropriate serving node. The MTC-IWF 440 may transmit a submit request message to the selected serving node 420 in step S401. As described above, if the selected serving node is set to the SGSN, the MTC-IWF transmits the submit request message through the T5a interface. If the selected serving node is set to the MME, the MTC-IWF transmits the submit request message through the T5b interface. If the selected serving node is set to the MSC, the MTC-IWF transmits the submit request message through the T5c interface.

The serving node 420 having received the submit request message transmits a trigger message to a target UE (UE-1) 410 of the device trigger in step S402. The serving node 420 having executed the trigger operation transmits a delivery report message to the MTC-IWF 460. The above delivery report message may indicate whether trigger delivery to the resultant MTC device of the device trigger requested by the MTC-IWF was successful or failed.

Figure 5:
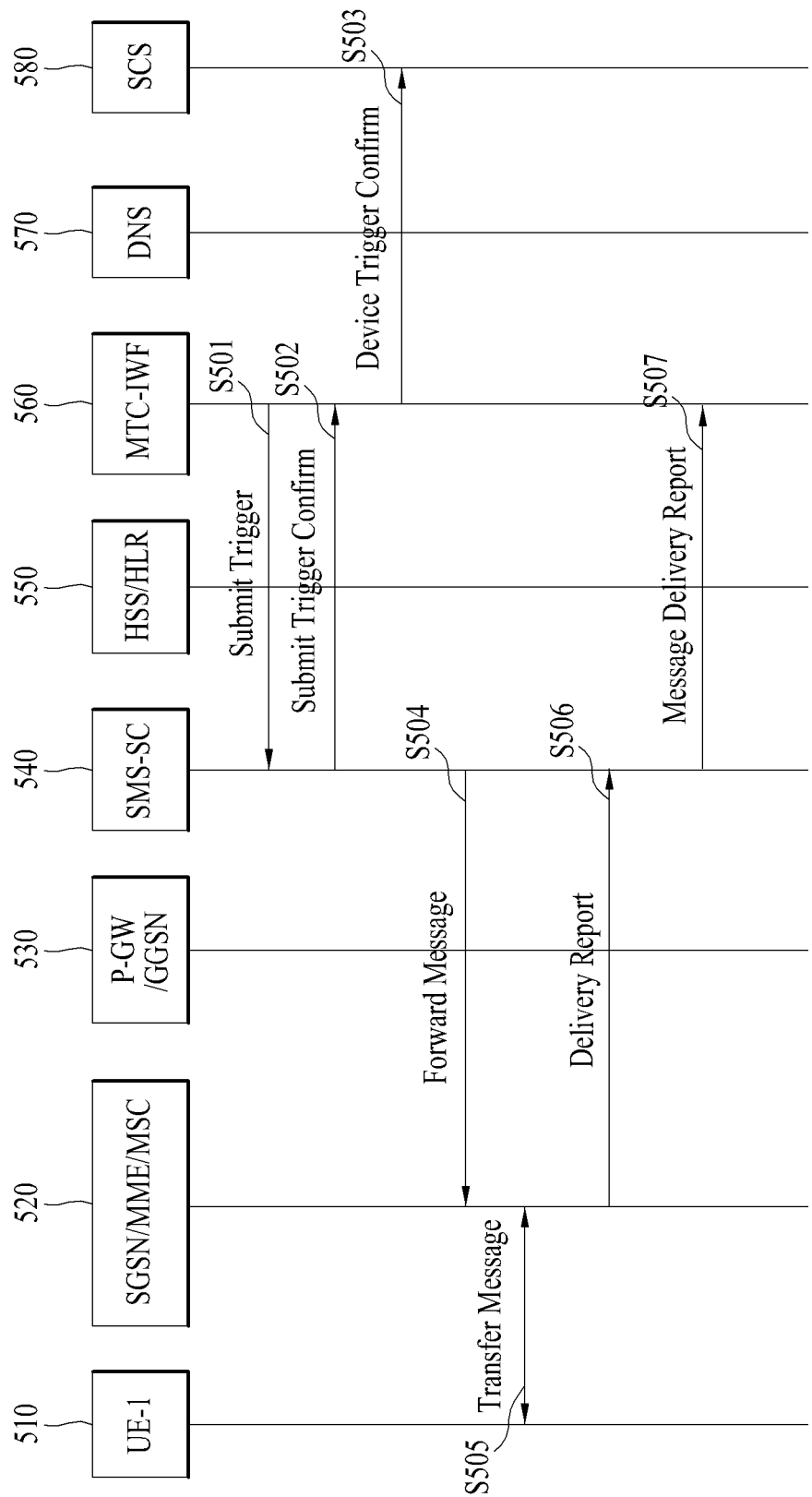
FIG. 5 is a flowchart illustrating the T4 trigger delivery procedure.

FIG. 5 is a flowchart illustrating the T4 trigger delivery procedure. Referring to FIG. 5, the MTC-IWF 560 may transmit a submit trigger message to an SMS-SC 540 on the basis of not only information contained in the device trigger request message received from the SCS 580 but also information contained in the subscriber information response message received from the HSS/HLR 550 in step S501. The SMS-SC 540 may transmit a submit trigger confirm message indicating acceptance of the submit trigger message to the MTC-IWF 560 in step S502. The MTC-IWF 560 having received the submit trigger confirm message from the SMS-SC 540 may send the SCS 580 a device trigger confirm message indicating acceptance of the device trigger request message transmitted from the SCS in step S503.

A short message including the device trigger message transmitted from the SMS-SC 540 is transferred to the serving node 520 in step S504. In this case, assuming that the device trigger message received by the SMS-SC 540 includes routing information (information regarding the serving node (s)), the SMS-SC 540 needs not interrogate the HSS/HLR 550 when acquiring the above routing information. In order to prepare for transmission failure of the short message, the SMS-SC 540 may store necessary information other than the routing information from among information received from the MTC-IWF 560.

The serving node 520 may transmit the short message to UE-1 510 in step S505. The UE-1 510 having received the short message including the device trigger message may respond to the serving node 520. The serving node 520 may transmit a delivery report message to the SMS-SC 540 in step S506. The delivery report message may indicate whether short-message delivery to the resultant MTC device of the short message delivery requested by the SMS-SC was successful or failed. If the short-message delivery has failed and a validity period of the device trigger message is not set to zero '0', the SMS-SC 540 may obtain routing information for transmitting the short message to the UE-1 510 by interrogating the HSS/HLR 550, and may perform retransmission using storage information of step S504. The SMS-SC 540 may send the MTC-IWF 560 a message delivery report message indicating whether trigger delivery to the resultant MTC device of the device trigger requested by the MTC-IWF was successful or failed in step S507.

Table 4 shows a variety of representative device trigger message-associated information to be stored for triggering with T4.

TABLE 4 i) External Identifier or MSISDN: Identification information of a triggered MTC device (or a subscriber to which the MTC device belongs). The external identifier or MSISDN is used to transmit a message delivery report message to the MTC-IWF.
ii) IMSI: Identification information of a triggered MTC device (or a subscriber to which the MTC device belongs).
iii) Trigger reference number or Reference number: Reference number of the transmitted trigger request message. Trigger reference number or Reference number is used to transmit a message delivery report message to the MTC-IWF.
iv) SCS identifier: Identifier of SCS configured to transmit the device trigger request message. The SCS identifier is used to transmit a message delivery report message to the MTC-IWF.
v) Trigger payload: Information transferred to an MTC application of MTC device
vi) Routing Information for SMS: This is information regarding a serving node to which a short message including the device trigger message will be transmitted.
vii) Priority: Delivery Priority of the device trigger request.
viii) Validity Period: Time interval in which device trigger request is valid. In more detail, if the trigger request is not transmitted to the MTC device, the device trigger request must be stored during the validity period.
viiii) SMS application port ID: This indicates that a purpose of the short message is for device triggering. The short message is transferred to a triggering function embedded in the MTC device.

Cell Broadcast Service (CBS)-Based Group Messaging

Figure 6:
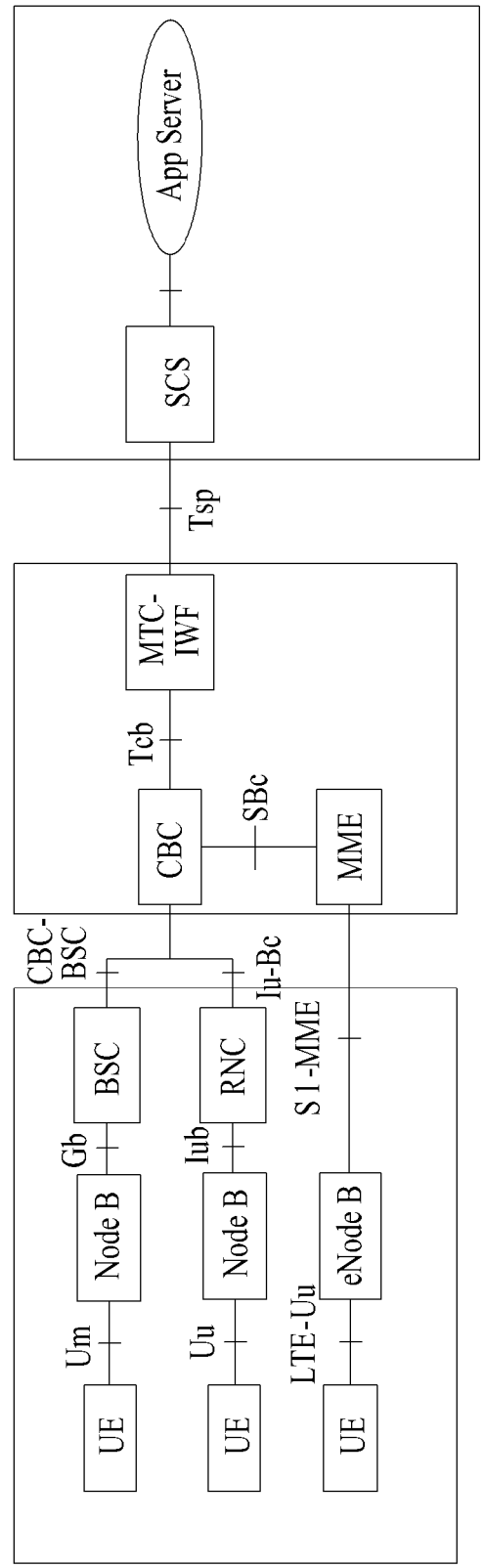
FIG. 6 is a conceptual diagram illustrating transmission of a group message.

FIG. 6 is a block diagram illustrating CBS or PWS (Public Warning System)-based group message transmission. Group message transmission based on a group message transmission structure of FIG. 6 may be achieved as follows. The group message from the application (App) server may be transferred from the SCS to the MTC-IWF through the Tsp interface. Here, the group message may include an external group identifier, geographic information, group message information, available Radio Access Technologies (RATs), the number of times and frequency/rate to broadcast the trigger/message, etc. If a geographical position/area of a device group is known to the MTC-IWF, and if the broadcast message must be broadcast to the overall geographic position/area, the geographic position/area information need not be transmitted to Tsp. The MTC-IWF may interrogate the HLR/HSS so as to map an external group identifier received through the Tsp interface to an internal cell broadcast group identifier. Through the above interrogation, the MTC-IWF may acquire appropriate Cell Broadcast Centre (CBC) information to be used for group message transmission. Alternatively, CBC information may also be configured in the MTC-IWF. The MTC-IWF may transmit the group message to the CBC. The CBC may transmit a group message to all the confirmed BSC(s) and/or RNC(s) and/or MME(s) so as to transmit the group message to a cell broadcast area. In order to broadcast the CBC/PWS type message/trigger, a target position/area may be used when the CBC decides the cell broadcast area. Contents of the application layer of the group message may be transferred to the CBS/PWS infrastructure along with a message/trigger application indicator, a geographic position/area, a radio access node, and a frequency/rate for broadcast. If the BSC receives the group message, the BSC may transmit the group message through a BTS according to the cell broadcast scheme. If an RNC receives the group message, the RNC may transmit the group message through the NodeB according to the cell broadcast scheme. If an MME receives the group message, the MME may transmit the group message through the eNodeB according to the cell broadcast scheme. The MTC device (or MTC UE) having received the MTC group message through the above procedures listens to a correct broadcast channel, and is configured along with a message ID information element. In addition, the MTC device may perform a specific operation (for example, creation of application data, establishment of connection to SCS/AS, or the like.) on the basis of a received application Packet Data Unit (PDU).

In accordance with the above-mentioned MTC group message transmission method and/or the conventional method for transmitting the MTC group message disclosed in PCT Application No. PCT/KR2013/002292, entitled "Method and Apparatus for triggering MTC Group in Wireless Communication System", which was filed by the applicant of the present invention, there is no discussion about how to perform retransmission under the condition that some of UEs serving as transmission targets of group message/triggering did not receive the group message or triggering. Accordingly, the following embodiments will disclose a method and apparatus for retransmitting the MTC group message. In the following description, the term "UE" may refer to an MTC UE or an MTC device, etc. All the cases in which the message/triggering is not transferred to a transmission target UE are generically named transmission failure. UEs serving as the message/triggering transmission target may be all UEs contained in the same MTC group, may be some UEs contained in the same MTC group {e.g., UEs located in a specific region from among UEs contained in the same MTC group, or UEs (i.e., UEs are not in a roaming state) designed to receive a service in a Home PLMN from among UEs contained in the same MTC group}, or may be some UEs (e.g., UEs located in a specific region, or UEs receiving a specific service) capable of being grouped irrespective of the MTC group or the MTC service.

In the following description, the MTC group message may include a group message, an MTC group triggering, and an MTC group triggering message. The operation for determining whether the MTC group message is retransmitted and the retransmission of the MTC group message may be carried out by MTC-IWF, CBC, and SCS, and a detailed description thereof will hereinafter be described in detail.

Embodiment 1

A first embodiment (Embodiment 1) indicates that the operation for determining whether the MTC group message is retransmitted and/or the retransmission of the MTC group message are/is carried out by the MTC-IWF.

Figure 7:
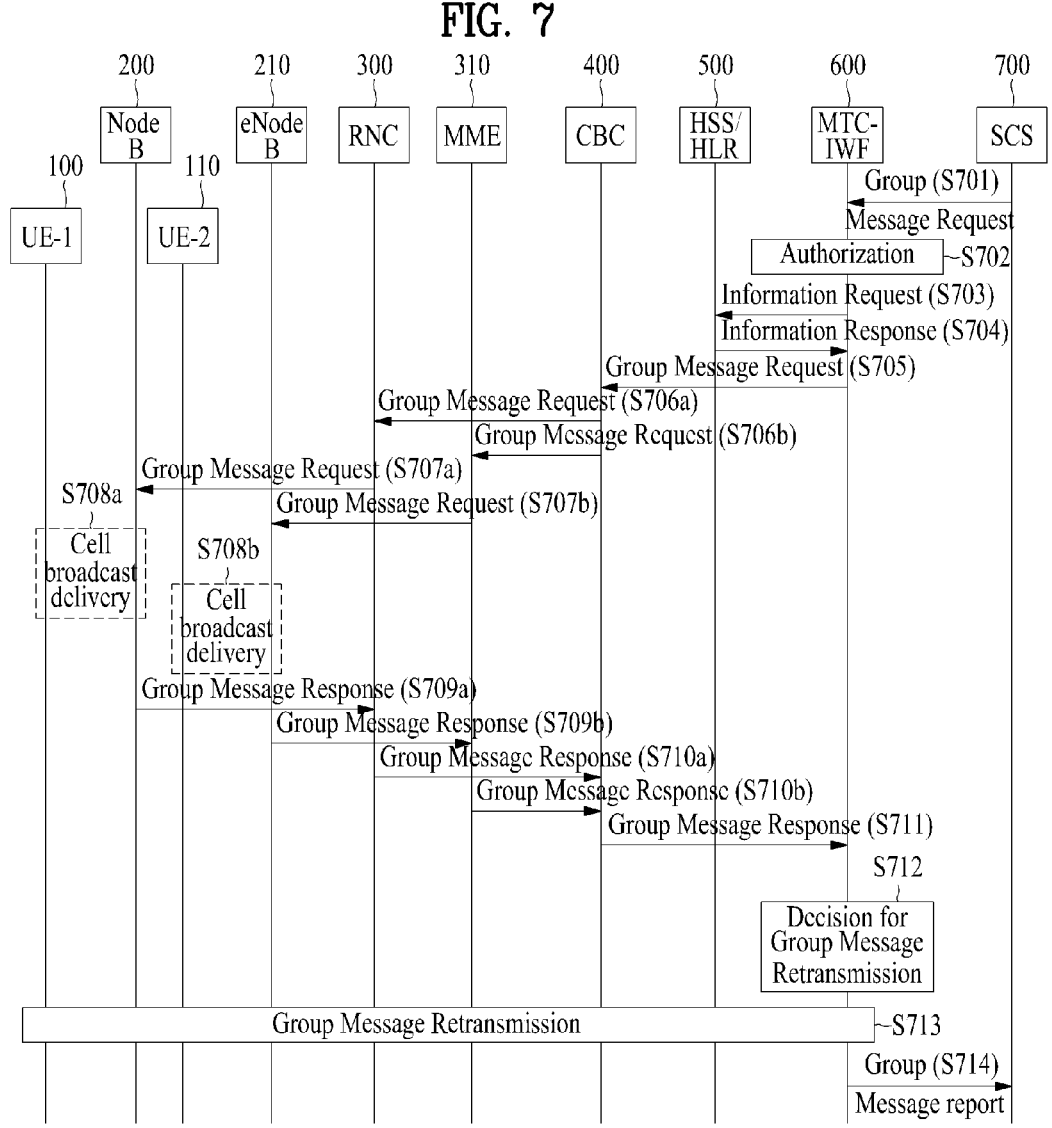
FIGS. 7 to 9 are flowcharts illustrating procedures of retransmitting an MTC group message according to embodiments.

FIG. 7 is a flowchart illustrating a series of procedures related to a first embodiment. Referring to FIG. 7, the SCS 700 may transmit a message (i.e., a group message request) for requesting group message transmission to the MTC-IWF 600 in step S701. If the SCS 700 does not include information of the MTC-IWF, the SCS 700 transmits a DNS query message to the DNS (not shown) using an identifier of the MTC group scheduled to transmit the group message or an identifier of the MTC-IWF configured in the SCS, such that the IP address and port number of the MTC-IWF can be decided. The group message request may include one or more information pieces from among the following information.

TABLE 5

External Group Identifier: Identifier of MTC group scheduled to transmit/broadcast a group message
Geographic Information: Information associated with a position/area at which UEs designed to transmit/broadcast a group message are located, or information regarding a region to which the group message should be transmitted.
Applicable RATs: RAT information for transmission/broadcast of the group message. The RAT information corresponds to at least one of E-UTRAN, UTRAN, and GERAN.
The number of transmission/broadcast times of the group message.
Frequency/Rate where the group message is transmitted/broadcast.
SCS identifier: Identifier of SCS configured to transmit the group message request.
Message Reference Number: Reference number of the transmitted group message request or a group message requested to be transmitted.
Validity Period: Lifetime of Group Message. If the group message is not transmitted to UE, the validity period indicates a predetermined time period in which a network entity (e.g., MTC-IWF) has to store the group message therein.
Priority: Delivery Priority of Group Message Request or group message.
Group Message pay load/information: Group message/information transferred to the MTC application of the UE In step S702, MTC-IWF 600 having received the group message request from the SCS 700 verifies the authority as to whether sending a message transmission request and/or a group message transmission request from the SCS to the 3GPP network is allowed. If the MTC-IWF 600 fails authority verification, the MTC-IWF 600 sends the SCS 700 a group message confirm message indicating that the group message request has failed. In contrast, if the MTC-IWF 600 succeeds in authority verification, the following step S703 is performed.

In step S703, the MTC-IWF 600 may transmit a message (i.e., an information request message) requesting information associated with group message transmission to the HSS/HLR 500. The information request message may include external group identifier information.

In step S704, HSS/HLR 500 may transmit a response message (i.e., information response message) including information requested by the MTC-IWF 600 to the MTC-IWF 600. The information response message may include internal group identifier information that is extracted from external group identifier information by HSS/HLR 500. In addition, the information response message may include appropriate CBC node information for transmitting the group message. Instead of providing the CBC node information by the HSS/HLR 500, CBC node information may be configured in the MTC-IWF 600.

In step S705, the MTC-IWF 600 may transmit a message (i.e., a group message request) requesting transmission/broadcast of a group message to the CBC 400. The above group message request may include internal group identifier information, and may include information necessary to be sent to the CBC from among information acquired from the SCS 700 in step S701.

In step S706, the CBC 400 may confirm/decide a cell broadcast area and RAT(s) (or the next node(s)) on the basis of information contained in the group message request received from the MTC-IWF 600 and/or other information owned by the CBC 400, and may transmit/broadcast the group message to all the confirmed MME(s) (BSC(s), RNC(s)) on the basis of the confirmed/decided result. CBC 400 may transmit a message (i.e., a group message request) requesting group message transmission/broadcast to all the confirmed RNCs 300 in step S706a. The CBC 400 may transmit a message (i.e., a group message request) requesting group message transmission/broadcast to all the confirmed MMEs 310 in step S706b. Although not shown in FIG. 8, assuming that the group message must be transmitted/broadcast to the GERAN, the CBC may transmit a group message transmission/broadcast request to all confirmed BSCs. Thereafter, the BTS may transmit the group message using the cell broadcast scheme.

In step S707a, the RNC 300 having received the group message may transmit the group message through the NodeB 200 according to the cell broadcast scheme. In step S707b, the MME 310 having received the group message may transmit the group message through the eNodeB 210 according to the cell broadcast scheme.

In step S708a, NodeB 200 may broadcast the group message. Alternatively, the RNC 300 may transparently broadcast the group message to the NodeB 200 according to the cell broadcast scheme in step S707a. In step S708b, the eNodeB 210 may broadcast the group message.

Details associated with a basic procedure for transmitting the group message from the CBC to the UE on the basis of CBS/PWS may be incorporated by referring to 3GPP TS 23.041.

In step S709a, the NodeB 200 may transmit a response message (i.e., group message response) to the group message transmission/broadcast request to the RNC 300. In step S709b, the eNodeB 210 may transmit the above group message response to the MME 310. In step S710a, the RNC 300 may transmit the above group message response to the CBC 400. In step S710b, the MME 310 may transmit the above group message response to the CBC 400.

In step S711, the MTC-IWF may receive the group message response serving as a response to the group message transmission/broadcast request from the CBC. In step S712, the MTC-IWF having received the group message response may decide whether the MTC group message is retransmitted on the basis of information contained in the group message response. A more detailed description of the steps S711~S712 is as follows.

The group message response received by the MTC-IWF may include zero or more region information pieces (based on a predetermined unit) indicating whether transmission of the MTC group message has been completed. (The group message response may be generated by CBC, and the information included in the response by CBC may be identical to information acquired from BSC/RNC/MME or be fabricated on the basis of this acquired information. Alternatively, the CBC may only transfer information acquired from BSC/RNC/MME.) Here, the region information may be information regarding a region where transmission of the MTC group message has been completed, or may be information regarding another region where transmission of the MTC group message was not completed.

If region information is information regarding the region where transmission of the MTC group message has been completed, the MTC-IWF compares information regarding a region where transmission is performed with information regarding the region where the transmission was completed so as to determine information of another region where transmission is not yet completed. In addition, if the number of transmission-completed region information pieces is zero, i.e., if information of the transmission-completed region is not (explicitly) contained in the group message response, the MTC-IWF may consider that data transmission to all regions where the CBC must perform transmission failed.

If the RAT is GERAN or UTRAN, a predetermined unit used as a unit of geographical information may be any of a cell unit, a location area unit, a routing area unit, a service area unit, a BTS unit, a BSC unit, a Node-B unit, an RNC unit, etc. In order to indicate information regarding the transmission-completed region, at least one of a conventional parameter {for example, the list of cells (e.g., "Cell-List sent from BSC/RNC to CBC, etc." prescribed in section 9.3.5.2 of TS 23.041) using cell-identifiers prescribed in section 9.3.11 of TS 23.041 and a No-of-Broadcasts-Completed-List parameter (See section 9.3.10 of TS 23.041), and a newly defined parameter may be used. If the conventional parameter is used, a new value and/or a new sub-parameter may be defined and used. Meanwhile, if RAT is E-UTRAN, a predetermined unit may be any one of a cell unit, a tracking area (TA) unit, a tracking area (TA) list unit, an emergency area unit, eNodeB unit, an MME unit, etc. In order to indicate information regarding the transmission-completed region, at least one of the conventional parameters (e.g., broadcast-completed area list parameter (See section 9.2.1.54 of TS 36.413)) and the newly defined parameter may be used. If the conventional parameter is used, a new value and/or a new sub-parameter may be defined and used.

The region information may include information of RAT categories (i.e., GERAN, UTRAN, and E-UTRAN). The region information may further include information indicating the transmission-completed region information. Alternatively, the region information may include only specific information indicating that data transmission to all regions has been completed, instead of including the above region information.

The region information may be information regarding a region where transmission of the MTC group message was not completed. (Alternatively, the region information may be information regarding a region where transmission of the MTC group message has failed.) In this case, assuming that a response to the MTC group message includes a zero number of the above predetermined-unit region information, the MTC-IWF may not decide to perform retransmission. The region information may include information of RAT categories (i.e., GERAN, UTRAN, and E-UTRAN). The region information may further include other information regarding a region where transmission of the region information was not completed. Alternatively, the region information may include only information indicating a failure of data transmission to all regions, instead of including the above region information. A parameter for indicating the region where transmission of the MTC group message has been completed may be used as a parameter indicating a region where transmission of the MTC group message was not completed. Alternatively, a detailed description of Failure-List Parameter (prescribed in section 9.3.14 of TS 23.041) may also be used.

The MTC-IWF group message response may include information regarding the cause of uncompleted transmission (or information regarding the reason of transmission failure). Assuming that each RAT is GERAN/UTRAN/E-UTRAN, a separated-type parameter or one parameter may be used not only in one case in which transmission failure occurs in each of BSC, RNC, and MME, but also in the other case in which transmission failure occurs in each of BTS, NodeB, and eNodeB. If RAT is GERAN or UTRAN (E-UTRAN), at least one of a conventional parameter (e.g., Cause Parameter and Cause-E-UTRAN parameter of TS 23.041) and a newly defined parameter may be used to indicate information regarding the reason of transmission failure. If the conventional parameter is used, a new value and/or a new sub-parameter may be defined and used.

If the reason behind transmission failure is associated with the CBC problem, this situation may also be contained in the reason information regarding transmission failure. The reason information regarding transmission failure (or information regarding the cause of transmission failure) may further include more detailed information. The above reason information regarding transmission failure may be comprised of congestion of cell/location area/routing area/tracking area, congestion of BSC/RNC/MME, congestion of BTS/NodeB/eNodeB, congestion of CBC, and specific information indicating unavailable retransmission.

MTC-IWF may decide whether the MTC group message is retransmitted on the basis of information contained in the above group message response. In this case, the decision as to whether retransmission is executed may be carried out on the basis of at least one of the following information (e.g., priority information, information requesting retransmission, and validity period information of the MTC group message).

If priority information of the group message is used as a reference point of the above decision, only a high-priority group message may be retransmitted during the above-mentioned decision procedure. Alternatively, specific information requesting such retransmission may be used as a reference for deciding retransmission of the group message. In this case, the information requesting retransmission may include information indicating whether retransmission is allowed only in some regions in which transmission failure occurs. Allowing retransmission to some regions in which transmission failure occurs is useful in case retransmission is impossible to some region from among a plurality of regions. If the retransmission request information indicates that retransmission is not allowed only in some regions in which transmission failure occurs and if retransmission is impossible to some region from among a plurality of regions, this means that retransmission is not performed in all regions. The retransmission request information may further include information as to whether retransmission per UE is allowed. In other words, the retransmission request information may include specific information as to whether independent execution of such retransmission is allowed. That is, the retransmission request information may include information as to whether retransmission is executed per UE requesting retransmission without using the CBS/PWS or MBMS scheme. Validity period (validity time) information of the MTC group message may be used to decide whether retransmission will be executed. For example, if a message exits the validity time or the validity time of a message expires, retransmission of this message may no longer be required. The validity period information may be denoted by duration information (e.g., a few minutes, a few hours, etc.), and the MTC-IWF may calculate the corresponding time period starting from a message reception time at which the MTC-IWF receives the MTC group message transmission request from the SCS. The validity period information may also be denoted in the form of an actual date. This information may be provided when the SCS transmits the MTC group message transmission request to the MTC-IWF, may be acquired from a third node such as HSS/HLR, may be derived from other information, or may be established in the MTC-IWF.

Subsequently, information of a region to which the MTC group message needs to be transmitted may be geographic information, or may be location-associated information for use in a mobile operator network.

The above-mentioned region information may be provided when the SCS transmits the MTC group message transmission request to the MTC-IWF, may be acquired from a third node such as HSS/HLR, or may be derived from other information.

A variety of information may be used as a reference for determining whether retransmission is required. As representative examples of such information, information of a region to which the MTC group message must be retransmitted (this region information may be geographic information or location-associated information of a mobile operator network); MTC-IWF configuration information (e.g., indicating that retransmission of all group messages is always performed); MTC group ID and/or cell broadcast message ID, or internal cell broadcast group ID (e.g., indicating that retransmission for a specific ID needs to be executed); information (e.g., the number of operation times for broadcast information and/or frequency/rate) provided when the SCS sends the MTC group message transmission request to the MTC-IWF; an operator policy and/or local policy; a subscriber preference and/or a subscriber rank/a subscription level; UE-associated information to be retransmitted {wherein the UE-associated information may include UE capability information (e.g., information as to whether a message can be received through the T4 interface, and information as to whether a message can be received through the T5 interface, etc.), and the UE information to be retransmitted may be acquired from a third node such as HSS/HLR and/or may be estimated by MTC-IWF on the basis of region information to be retransmitted}; a mechanism available for the MTC-IWF configured to perform MTC group message transmission and/or separate (or independent) message transmission; congestion of T4 interface and/or SMS-SC; congestion of T5 interface and/or SGSN/MME/MSC; congestion of RAN; load of MTC-IWF; and various state information of a network may be used as the above described reference for determining whether retransmission is required.

Upon making the retransmission decision result, although a transmission failure has occurred in some regions (or some nodes or some UEs), the MTC-IWF may not perform retransmission in all regions (or all nodes or all UEs) at all. Alternatively, upon making the retransmission decision result, although a transmission failure has occurred in some regions (or some nodes or some UEs), retransmission may not be performed in a certain region (or a certain node or UE) from among the some regions, and retransmission may be performed only in the remaining regions (or nodes or UEs) other than the certain region.

The above-mentioned retransmission decision may include information indicating whether retransmission will be immediately performed, information indicating whether retransmission will be performed after a predetermined time, and information indicating whether retransmission will be performed after receiving a message (e.g., notification message indicating an available transmission state) from a retransmission-requested node (e.g., BSC, RNC, MME, BTS, NodeB, eNodeB, HSS/HLR, SGSN, and MSC). In order to receive the notification message indicating the available transmission state, the MTC-IWF may enable the corresponding node to be directly or indirectly registered in a notification service.

The above retransmission decision procedure may include determining a mechanism for executing retransmission. For example, the retransmission decision procedure may decide whether retransmission will be carried out using the CBS/PWS scheme or the MBMS scheme, may decide whether retransmission will be group-based carried out using the T4 interface, may decide whether retransmission will be group-based carried out using the T5 interface, may decide whether retransmission will be separately carried out using the T4 interface, or may decide whether retransmission will be separately carried out using the T5 interface.

In step S713, assuming that the MTC-IWF 600 decides to perform retransmission, the MTC-IWF 600 may retransmit the group message on the basis of the decision result of step S712.

In step S714, the MTC-IWF 600 may transmit a report message of the group message transmission request (i.e., a group message report) to the SCS 700.

Embodiment 2

Figure 8:
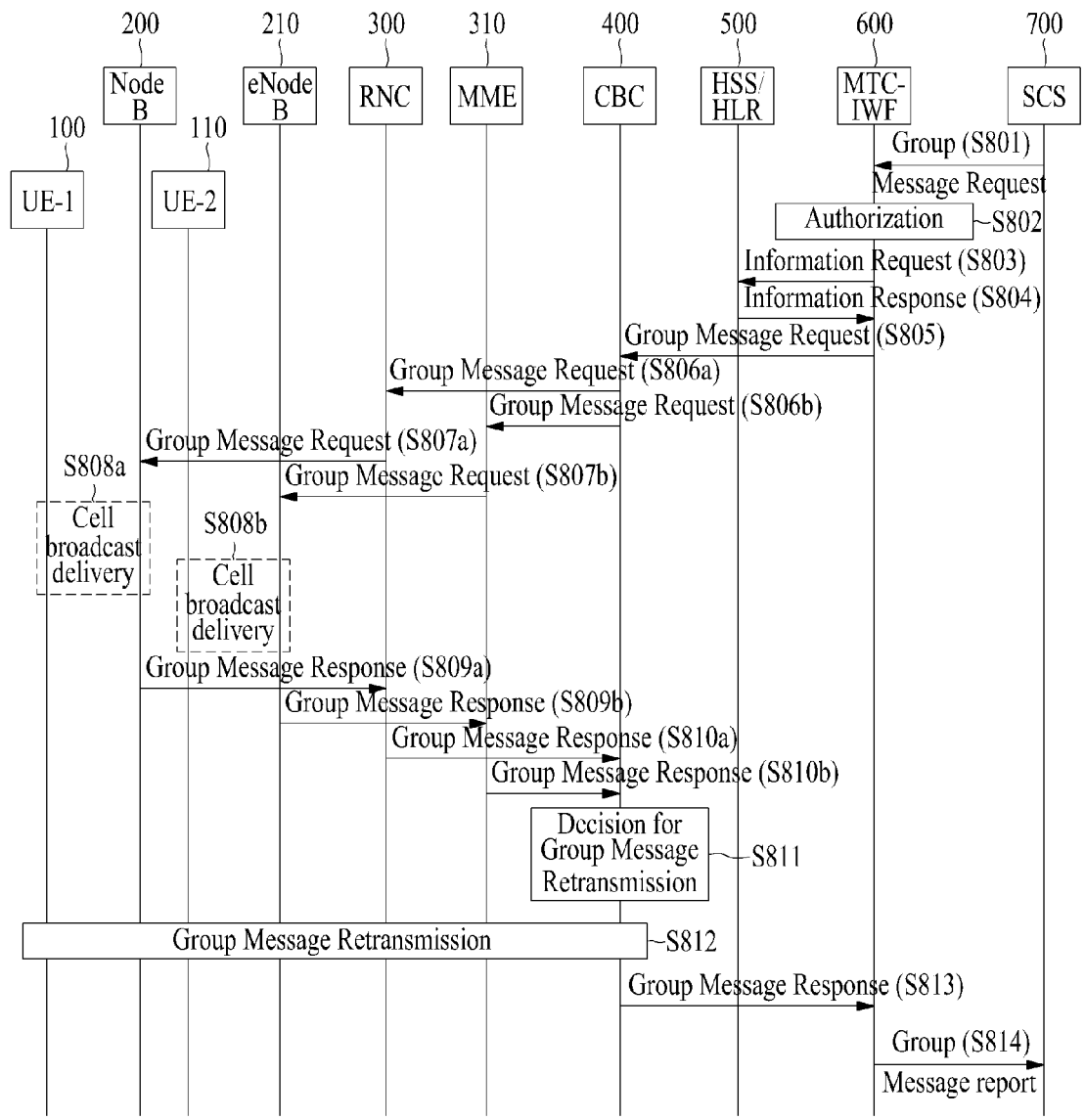

A procedure for deciding whether the CBC retransmits the group message and performing retransmission of the group message according to the decision result is shown in FIG. 8. Detailed description of steps S801~S810*a* of FIG. 8 is replaced with those of steps S701~S710*a* of FIG. 7 for convenience of description. In step S810*b*, the CBC may receive a response (i.e., group message response) to the MTC group message transmission request from the MME (or BSC or RNC). The above response message may be a newly defined message or a conventional message such as REPORT Response/Confirm, REJECT Response/Confirm, or the like. If the entity transmitting the group message response is the MME as shown in FIG. 8, the group message response may be a Write-Replace Warning Confirm message or a Write-Replace Warning Indication message. Upon receiving the MTC group message transmission request from the CBC, BSC/RNC/MME may verify this request message and immediately transmit the verified request message to the CBC. After a cell broadcast request is sent to BTS/NodeB/eNodeB, the BSC/RNC/MME may transmit a response message to the CBC on the basis of a response message from the BTS/NodeB/eNodeB.

The group message response may only indicate that the group message transmission was successful or failed. In addition, the number of region information pieces of a predetermined unit to indicate whether the MTC group message transmission was completed may be set to at least zero '0'. In this case, the region information may be any one of information of a first region in which transmission of the MTC group message was completed and information of a second region in which transmission of the MTC group message is not yet completed. The RNC may generate the following information by itself, or may acquire the following information from the NodeB (wherein the acquisition time of the above information may be located before and/or after the NodeB attempts/performs the cell broadcast). The MME may generate the following information by itself, or may acquire the following information from the eNodeB (wherein the acquisition time of the above information may be located before and/or after the eNodeB attempts/performs e cell broadcast). Detailed description of the remaining region information has already been disclosed in the first embodiment (Embodiment 1), and as such a detailed description thereof will be omitted herein.

In step S811, the CBC may decide whether to retransmit the MTC group message on the basis of information contained in the group message response. In this case, a variety of information may be used as a reference for deciding retransmission of the following information. As representative exemplary information, information contained in a response received from BSC, RNC and/or MME, information predictable from the response, information of a region to which the MTC group message needs to be transmitted (this region information may be provided when the MTC-IWF sends the CBC the MTC group message transmission request or may be derived from other information), information of a region to which the MTC group message needs to be retransmitted, CBC configuration information (e.g., indicating that all group messages must be retransmitted at all times), MTC group ID and/or cell broadcast message ID, or internal cell broadcast group ID (e.g., indicating that retransmission for a specific ID needs to be executed, this information may be provided when the MTC-IWF transmits the MTC group message transmission request to the CBC), priority information of a group message (e.g., if the group message has high priority, retransmission is performed; and this priority information may be provided when the MTC-IWF transmits the MTC group message transmission request to the CBC or may be derived from other information), and information requesting retransmission may be used as the above described reference for determining whether retransmission is required. This retransmission request information may include specific information indicating whether retransmission is performed only in some regions from among several failed regions. For example, a response message received by the CBC through RNC#1 may include specific information indicating a region where transmission was not completed, such that the CBC can determine whether retransmission is required on the basis of the response message. A response message such as a REJECT response/confirm message is received from the RNC#2. If it is determined that retransmission is impossible, and if the retransmission request information indicates that retransmission is performed only in some regions from among the failed regions, the CBC may retransmit the MTC group message only to a transmission-uncompleted region responding to RNC#1. If the retransmission request information indicates that retransmission only to some regions from among the failed regions is not allowed, the CBC may finally decide that retransmission is no longer required. This region information may be provided when the MTC-IWF sends the CBC the MTC group message transmission request or may be derived from other information.

Subsequently, the decision reference may include validity period (or validity time) information of the MTC group message, information (e.g., the number of operation times for broadcast information and/or frequency/rate) provided when the MTC-IWF transmits the MTC group message transmission request to the CBC, an operator policy and/or a local policy. For example, if a message exits the validity time, retransmission of this message may no longer be required. The validity period information may be denoted by duration information (e.g., a few minutes, a few hours, etc.), and it is possible to calculate the corresponding time period starting from a message reception time at which the CBC receives the MTC group message transmission request from the MTC-IWF. The validity period information may also be denoted in the form of an actual date. This information may be provided when the MTC-IWF transmits the MTC group message transmission request to the CBC or may be derived from other information.

Among the above-mentioned information, information provided when the MTC-IWF transmits the MTC group message transmission request to the CBC may be any one of information received by the MTC-IWF through the SCS, information generated by the MTC-IWF (i.e., information generated when the SCS transmits the MTC group message transmission request to the MTC-IWF), and information acquired from a third node such as HSS/HLR.

After the CBC receives a response message from all nodes (e.g., BSC, RNC, MME) requesting MTC group message transmission, the CBC may decide whether retransmission is performed on the basis of the above-mentioned one or more information, or may decide whether retransmission is separately performed whenever a response message from each node is received on the basis of the above-mentioned one or more information. Needless to say, the procedure for deciding the presence or absence of separate retransmission may include deciding whether retransmission to all nodes is required, and finally re-deciding whether separate retransmission is required.

Upon making the retransmission decision result, although a transmission failure has occurred in some regions (or some nodes), the CBC may not perform retransmission in all regions (or all nodes) at all. Alternatively, upon making the retransmission decision result, although a transmission failure has occurred in some regions (or some nodes), retransmission may not be performed in a certain region (or a certain node) from among the some failed regions, and retransmission may be performed only in the remaining regions (or nodes) other than the certain region.

The above-mentioned retransmission decision may include information indicating whether retransmission will be immediately performed, information indicating whether retransmission will be performed after lapse of a predetermined time, and information indicating whether retransmission will be performed after receiving a message (e.g., notification message indicating an available transmission state) from a retransmission-requested node (e.g., BSC, RNC, MME, BTS, NodeB, and eNodeB). In order to receive the notification message indicating the available transmission state, the CBC may enable the corresponding node to be directly or indirectly registered in a notification service.

In step S812, assuming that the CBC 400 decides to perform retransmission, the CBC 400 may retransmit the group message on the basis of the decision result of step S811. For retransmission, the conventional message (for example, in case of GERAN and UTRAN, the conventional message 'WRITE-REPLACE' may be used; and in case of E-UTRAN, the conventional message 'WRITE-REPLACE-WARNING-REQUEST' may be used), or a new message may be defined and used.

Embodiment 3

Figure 9:
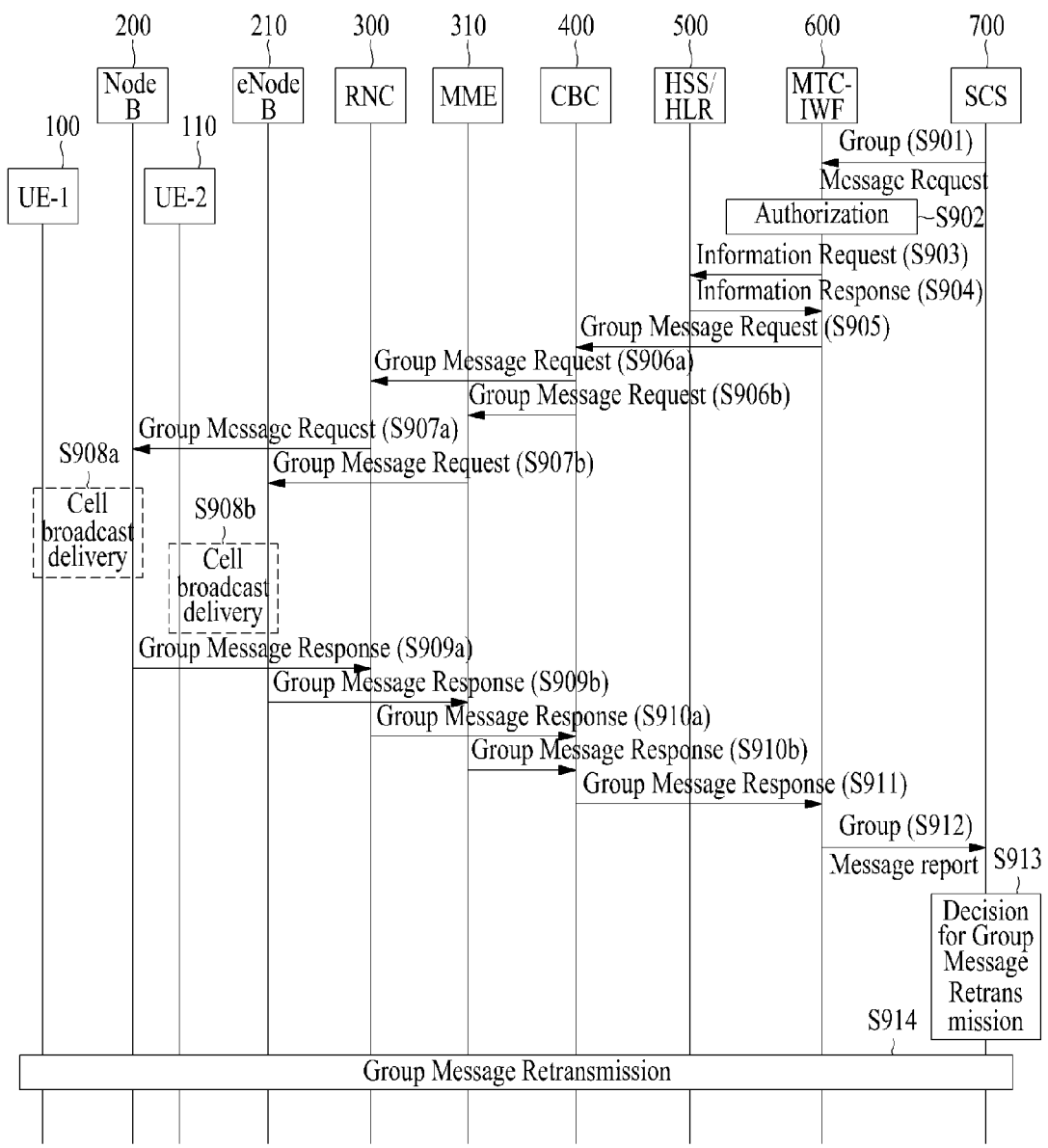

A procedure for deciding whether the SCS retransmits a group message and performing retransmission of the group message according to the decision result is shown in a third embodiment (Embodiment 3) of FIG. 9. Detailed description of steps S901~S910b of FIG. 9 is replaced with those of the first embodiment (Embodiment 1) for convenience of description. Description of step S911 of FIG. 9 is replaced with those of step S711 of FIG. 7 showing the first embodiment (Embodiment 1). In step S912, the MTC-IWF 600 may transmit a group message report to the SCS 700. The group message report may include region information of a predetermined unit so as to indicate whether group message transmission was completed. This region information may include at least one of i) information regarding a region where transmission was completed, ii) information regarding a region where transmission was not completed (or information regarding a transmission-failed region), iii) information regarding UE(s) where transmission was completed, iv) information regarding UE(s) where transmission was not completed (or information regarding transmission-failed UEs), and v) information regarding the cause of uncompleted transmission (or information regarding the cause of transmission failure). In a more detailed description of the above-mentioned information (i)~(v), region information having been transmitted by the MTC-IWF may be modified into location/area information understood by the SCS and then provided. This modification may be carried out by interworking with a third node such as an HSS/HLR, and may be carried out according to configuration information stored in the MTC-IWF. Region information where transmission was completed may include information of various RAT types.

Region information where the MTC-IWF has not completed transmission may be modified into location/area information understood by the SCS, and then provided. This modification may be carried out by interworking with a third node such as an HSS/HLR, and may be carried out according to configuration information stored in the MTC-IWF. Region information where transmission was not completed may include various RAT types of information.

Various types of information including external ID information regarding transmission-completed UE(s) may be provided. The above-mentioned information may be derived from region information where transmission was completed and/or other region information where transmission was not completed, may be acquired by interworking with a third node such as HSS/HLR, and/or may be acquired from information stored in the MTC-IWF.

Information regarding UE(s) where transmission was not completed (or information regarding UE(s) where a transmission failure occurs) may include external ID information regarding UE(s) where transmission was not completed, thereby providing a variety of information. The above-mentioned information may be derived from region information where transmission was completed or other region information where transmission was not completed, may be acquired by interworking with a third node such as HSS/HLR, and/or may be acquired from information stored in the MTC-IWF.

Information regarding the cause of uncompleted transmission may be managed with various granularities, and may include a variety of information (for example, various RAT types of information). The above reason information may include congestion of RAN, congestion of CN (Core Network), congestion of MTC-IWF, congestion of a Tsp interface, etc.

In step S913, the SCS may decide to retransmit the group message on the basis of at least one of the following decision references. In this case, a reference for deciding the group message retransmission may include information contained in a response received from the MTC-IWF and/or information predictable from the response; information regarding a region to which the MTC group message must be transmitted; information regarding a region to which the MTC group message must be retransmitted; configuration information contained in the SCS (i.e., SCS configuration information indicating that all group messages must be retransmitted at all times); an MTC group ID (e.g., indicating that retransmission for a specific ID must be executed); priority information of a group message (e.g., if the group message has high priority, retransmission is performed); an operator policy and/or a local policy; and a subscriber preference and/or a subscriber rank/a subscription level.

Upon making the retransmission decision result, although a transmission failure has occurred in some regions (or some nodes or some UEs), the SCS may not perform retransmission in all regions (or all nodes or all UEs) at all. Alternatively, upon making the retransmission decision result, although a transmission failure has occurred in some regions (or some nodes or some UEs), retransmission may not be performed in a certain region (or a certain node or UE) from among the some regions, and retransmission may be performed only in the remaining regions (or nodes or UEs) other than the certain region.

The above-mentioned retransmission decision may include information indicating whether retransmission will be immediately performed, information indicating whether retransmission will be performed after lapse of a predetermined time, and information indicating whether retransmission will be performed after receiving a message (e.g., notification message indicating an available transmission state) from a retransmission-requested node (e.g., MTC-IWF or the like). In order to receive the notification message indicating the available transmission state, the SCS may enable the MTC-IWF to be directly or indirectly registered in a notification service.

The above retransmission decision procedure may include determining a mechanism for executing retransmission. For example, the retransmission decision procedure may decide whether retransmission will be carried out pm a group basis (i.e., by sending the group message transmission request to the MTC-IWF), and may decide whether retransmission will be separately carried out (i.e., by sending a per-UE message transmission request to the MTC-IWF).

In step S914, assuming that the SCS 700 decides to perform retransmission, the SCS 700 may retransmit the group message on the basis of the decision result of step S913.

Although the above-mentioned embodiments have disclosed the exemplary case in which the CBS/PWS scheme is used as the MTC group message transmission scheme, the scope of the present invention can also be extended to other cases in which other MTC group message transmission schemes (e.g., MBMS scheme) are used.

Device Structure According to Embodiments

Figure 10:
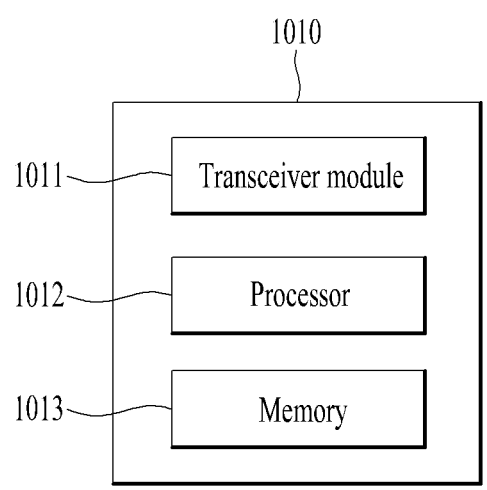
FIG. 10 is a block diagram illustrating a device according to embodiments.

FIG. 10 is a block diagram illustrating a UE device and a network node device according to embodiments.

Referring to FIG. 10, a device 1010 according to the embodiments may include a transmission/reception (Tx/Rx) module (also called a transceiver module) 1011, a processor 1012, and a memory 1013. The Tx/Rx module 1011 may transmit and receive a variety of signals, data and information to and from an external device (network node (not shown) and/or server device (not shown)). The processor 1012 may provide overall control to the device 1010, and process information to be transmitted/received to/from the external device. The memory 1013 may store the processed information for a predetermined time. The memory 1013 may be replaced with a component such as a buffer (not shown).

The processor of the device 1010 according to one embodiment may process operations required for the above-mentioned embodiments.

The overall configuration of the device 1010 may be implemented such that the above described various embodiments of the present invention may be independently applied or two or more embodiments thereof may be simultaneously applied and a repeated description thereof is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The above-mentioned embodiments can be applied to various mobile communication systems.

What is claimed is:

1. A method for performing retransmission of a Machine Type Communication (MTC) group message by an MTC-InterWorking Function (MTC-IWF) in a mobile communication system, the method comprising:
   receiving an MTC group message response from a network node; and
   determining whether to perform retransmission of the MTC group message on the basis of information contained in the MTC group message response,
   wherein the MTC group message response includes zero or more region information of a predetermined unit, related to completion of the MTC group message transmission,
   wherein the region information indicates information regarding a region where transmission of the MTC group message was not completed, and
   wherein, if a response to the MTC group message includes zero region information of the predetermined unit, the MTC-IWF decides not to perform the retransmission.

2. The method according to claim 1, wherein the region information indicates information regarding a region where transmission of the MTC group message has been completed.

3. The method according to claim 2, wherein the determining whether to perform the retransmission further includes:
   comparing information regarding a region where transmission is performed with information regarding another region where the transmission has been completed.

4. The method according to claim 2, wherein:
   if the MTC group message response includes zero region information of the predetermined unit, the MTC-IWF determines that transmission to all regions has failed.

5. The method according to claim 1, wherein at least one of priority information, information requesting the retransmission, and validity period information of the MTC group message is used for determining whether to perform the retransmission.

6. The method according to claim 5, wherein the MTC-IWF decides to retransmit only a high-priority group message.

7. The method according to claim 5, wherein the information requesting retransmission includes information indicating whether retransmission to some regions is allowed, and
   if the information requesting retransmission indicates that the retransmission to the some regions is not allowed, the MTC-IWF always decides not to perform the retransmission.

8. The method according to claim 5, wherein the information requesting retransmission includes information indicating whether retransmission per user equipment (UE) is allowed.

9. The method according to claim 1, wherein the predetermined unit is any one of a tracking area unit, a tracking area list unit, an emergency area unit, an eNB unit, and a mobility management entity (MME).

10. The method according to claim 1, wherein the network node is a Cell Broadcast Centre (CBC).

11. A Machine Type Communication-InterWorking Function (MTC-IWF) device for use in a wireless communication system, the MTC-IWF device comprising:
   a transceiver module; and
   a processor configured to:
      receive an MTC group message response from a network node, and
      determine whether to perform retransmission of the MTC group message on the basis of information contained in the MTC group message response,
   wherein the MTC group message response includes zero or more region information of a predetermined unit, related to completion of the MTC group message transmission,
   wherein the region information indicates information regarding a region where transmission of the MTC group message was not completed, and
   wherein, if a response to the MTC group message includes zero region information of the predetermined unit, the MTC-IWF decides not to perform the retransmission.

* * * * *